United States Patent [19]

Pleva

[11] Patent Number: 5,415,508
[45] Date of Patent: May 16, 1995

[54] TENSIONING SYSTEM

[75] Inventor: Walter F. Pleva, Indialantic, Fla.

[73] Assignee: Universal Loading Spring Corp., Clearwater, Fla.

[21] Appl. No.: 213,536

[22] Filed: Mar. 16, 1994

[51] Int. Cl.⁶ .......................... F16B 31/02; G01L 5/00
[52] U.S. Cl. ...................................... 411/11; 411/14; 116/212; 116/DIG. 34
[58] Field of Search .................... 411/10–12, 411/14; 116/212, DIG. 34; 73/761

[56] References Cited

U.S. PATENT DOCUMENTS

| | | | |
|---|---|---|---|
| 3,851,386 | 12/1974 | Ellzey, Jr. | 411/14 X |
| 4,760,740 | 8/1988 | Meisterling | 411/14 X |
| 5,165,831 | 11/1992 | Yager et al. | 411/14 |
| 5,199,835 | 4/1993 | Turner | 411/11 |

FOREIGN PATENT DOCUMENTS 2421300 11/1979 France ................................. 411/11

Primary Examiner—Neill R. Wilson

[57] ABSTRACT

A compression system for joining structural components under tension utilizing a bolt with a shank, an end and a head, one or more flat washers and one or more compression springs. One of the structural components, the bolt end and the nut carry indicia means that form a linear relationship with each other when the system is in an initial tensioned and starting condition and form a selectably angular relationship when the nut is tightened on the bolt a predetermined amount. The system enables the consistent uniform tightening of the system elements to combine structural components and provide consistent spring loading throughout.

15 Claims, 2 Drawing Sheets

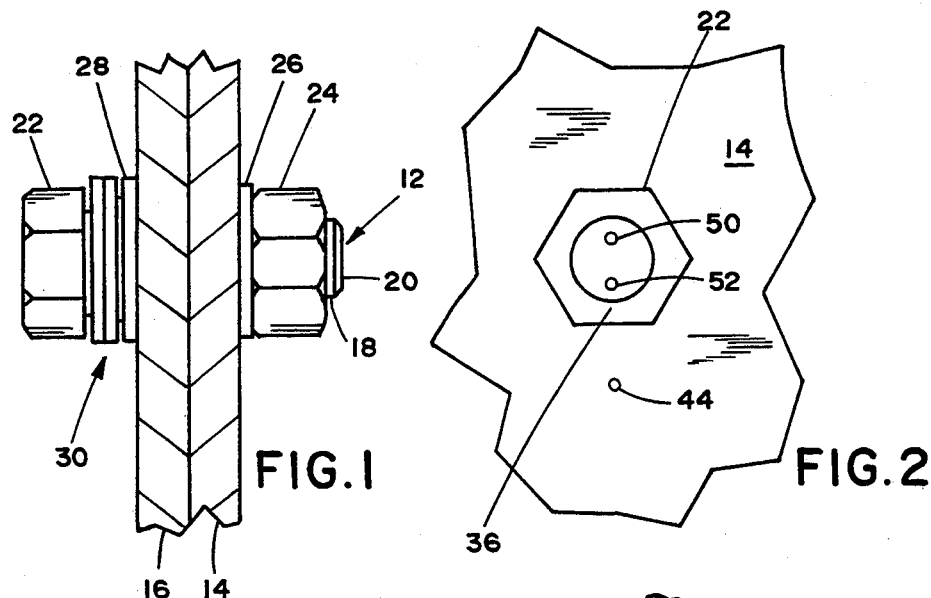
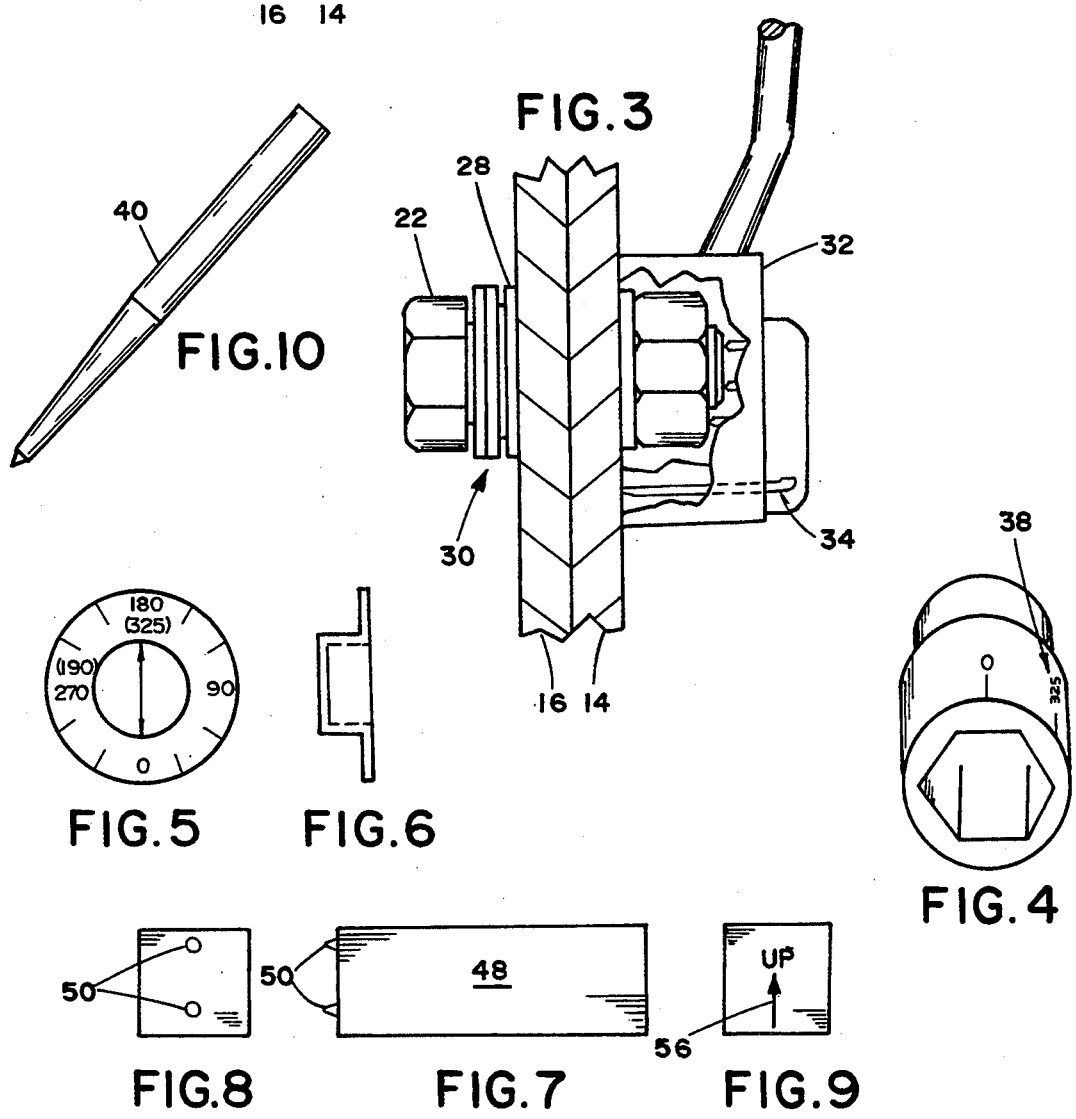

TENSIONING SYSTEM

BACKGROUND OF THE INVENTION

1. Field of the Invention

The present invention relates to tensioning systems for measuring the tensions produced when structural components are joined by bolts, a nut and compression springs.

2. Description of the Prior Art

Torque wrenches are commonly used to provide an indication of the amount of force exerted when bolts are used to join structural components, however these devices are not precise with their readings for high tension loads due to friction and rapidly change in reading sensitivity during use. While new tensioning devices have been produced in recent years, such as that disclosed in U.S. Pat. No. 5,072,917, there still is a need to have a reliable force reading device associated with the application of such springs in commonly experienced structural situations.

It is to this need that the present invention is directed.

OBJECTIVES AND SUMMARY OF THE INVENTION

It is an objective of the present invention to provide a readable and predictable tensioning system for use in joining structural components under tension that is far more reliable that any system heretofore utilized.

Another objective of the present invention is to provide a system of the type described which utilizes a bolt having a shank, head and end, a nut threadably associated therewith, and at least one compression spring.

Yet another objective of the present invention is to provide a system of the type described which utilizes a plurality of indicia means that assume predictable relationships with each other to provide accurate readings of tension applied when structural components are joined.

Yet still another objective of the present invention is to provide a system of the type described that enables the tensioning of elements joining structural components at a consistently uniform level.

A further objective of the present invention is to provide a system of the type described wherein joining components such as nuts and bolts can be tightened to the same levels of tension without variation.

The present invention is a tensioning system utilizing a bolt having a shank, a head and an end, a nut and at least one compression spring as well as a number of flat washers. One of the structural components, the nut, and the bolt end each have indicia means positioned thereon that in a first stressed or starting condition assume a linear relationship and are positionable at selectable angular relationships each with the other one when the nut is tightened on the bolt a predetermined amount. The indicia means are usually indentations formed by punching the surface of the structural component, bolt end and nut, and some of these punching actions can be done with improved tools for operably utilizing the system.

Thus there has been outlined the more important features of the invention in order that the detailed description that follows may be better understood and in order that the present contribution to the art may be better appreciated. There are additional features of the invention that will be described hereinafter and which will form the subject matter of the claims appended hereto. In this respect, before explaining at least one embodiment of the invention in detail, it is to be understood that the invention is not limited in its application to the arrangement of the components set forth in the following description or illustrated in the drawings. The invention is capable of other embodiments and of being practiced and carried out in various ways.

It is also understood that the phraseology and terminology employed herein are for the purpose of description and should not be regarded as limiting. As such, those skilled in the art will appreciate that the concept upon which this disclosure is based may readily be utilized as a basis for designing other structures, methods, and systems in carrying out the several purposes of the present invention.

It is important that the claims be regarded as including such equivalent methods and products resulting therefrom that do not depart from the spirit and scope of the present invention. The application is neither intended to define the invention of the application which is measured by its claims nor to limit its scope in any way.

Thus the objectives of the invention set forth above along with the various features of novelty which characterize the invention are noted with particularity in the claims annexed to and forming part of this disclosure. For a better understanding of the invention, its operating advantages, and the specific results obtained by its uses, reference should be made to the following detailed specification taken in conjunction with the accompanying drawings in which like characters of reference designate like parts throughout the several views.

BRIEF DESCRIPTION OF THE DRAWINGS

FIG. 1 is a side elevational view of the system forming the present invention which is joining two structural components;

FIG. 2 is an end elevational view of the system shown in FIG. 1 illustrating the indicia in linear alignment when the system is in an initial angular relationship and a first tensioned or preload condition;

FIG. 3 is a side elevational sectional view of a specially designed socket wrench for providing indicia on the bolt face, nut, and structure of the present system;

FIG. 4 is a perspective and fragmentary view of the socket wrench shown in FIG. 3 illustrating zero and necessary angles for different bolt sizes and lengths;

FIG. 5 is a front view of a clear template carrying angular markings on its outside surface and enabling the angular readings of markings on the side of the nut;

FIG. 6 is a side elevational and sectional view of the device shown in FIG. 5;

FIG. 7 is a side elevational view of a bolt marker utilized to apply indicia to the bolt end of the present system;

FIG. 8 is an end elevational view of the marker of FIG. 7;

FIG. 9 is a plan view of the marker of FIG. 7;

FIG. 10 is a punch utilized to apply indicia on the various components of the system comprising the present invention;

DETAILED DESCRIPTION OF THE DISCLOSURE

Figure 13:
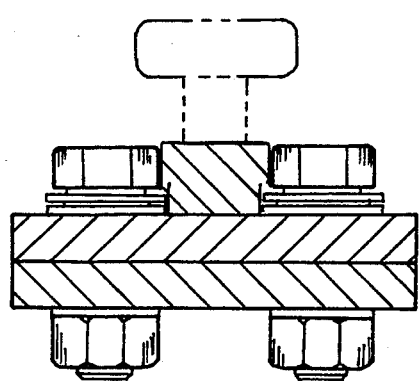
FIG. 13 is an end elevational sectional view of the device shown in FIG. 11 taken along lines A—A.
Figure 11:
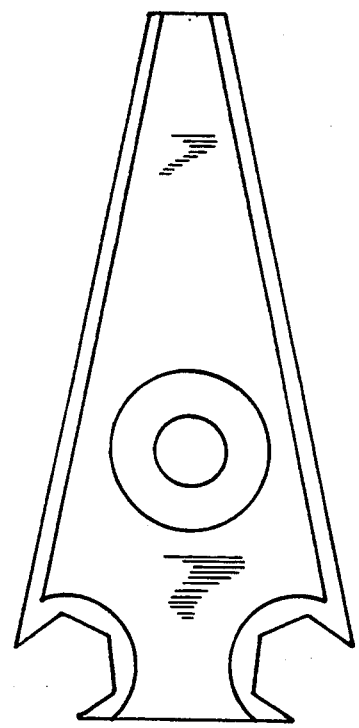
FIG. 11 is a plan view of one form of the tool utilized to hold a pair of bolt heads stationary while the present system is installed.
Figure 12:
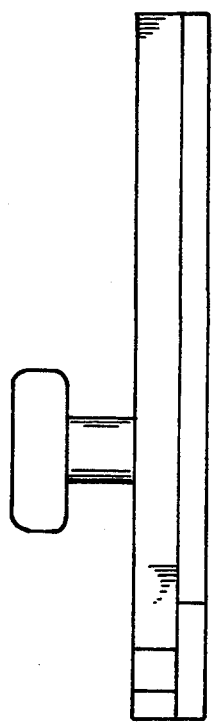
FIG. 12 is a side elevational view of the tool shown in FIG. 11.
Figure 14:
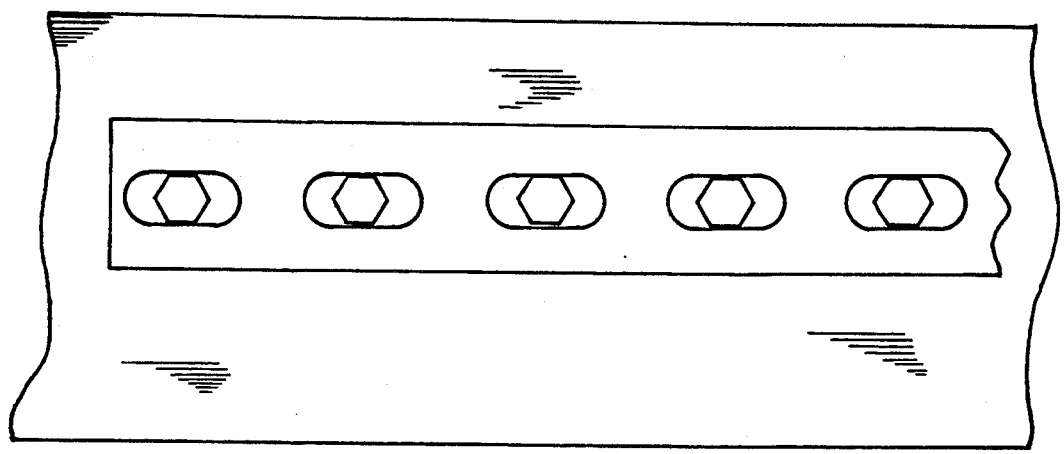
FIG. 14 is a plan view of another tool utilized to hold the heads of multiple bolts stationary while the present system is attached.

Referring now to the drawings and particularly to FIG. 1, a fastening bolt shown generally as 12 forming a part of the present invention is used to join two structural elements 14, 16 which have an appropriate aperture or other accommodation within which the bolt may be inserted. The bolt has a shank 18, an end 20 and a head 22 of a conventional nature. It utilizes a threadably received nut 24 and preferably uses one or more flat washers 26, 28 in the manner shown. It also accommodates a compression spring shown generally as 30 representative of which is shown in U.S. Pat. No. 5,072,917.

The installation procedure begins with applying a first predetermined tension or preload to nut 24 with the bolt head locked in position so that it cannot rotate. Installation continues by marking with indentations 50, 52 nut 36, head 22 and structure 44 at the first tensioned or preload position with a specially designed socket wrench 32 for each sized bolt used which is equipped with a slidably maintained pin 34 that can be struck with a hammer when the wrench is in use to form an indentation 36 on the outside surface of nut 24. Indentation 36 becomes a part of several indicia to be used with the present invention and will be more specifically described hereafter.

Socket wrench 37 for each size bolt is provided with an angular scale 38 best shown in FIG. 4 so that a consistent amount of rotation is given each nut to be certain that tensioning is uniform in all uses.

After the system is formed as shown in FIG. 1, indentation 36 is formed in nut 24 after wrench 32 has been used to threadably engage nut 24 on shank 18. The nut is positioned in a first tensioned arrangement where the angular scale reads zero. Indentation 36 is formed at the lower edge of nut 24 as shown in FIG. 4.

A plate marker punch 40 is used to score the surface of component 14 with an indentation 44 directly above indentation 36 so that a vertical line will pass through indentations 36 and 44. With the system still at the zero angular position (first tensioned position) a bolt marker 48 having two indenting tips 50 is used to score end 20 of bolt 12 in the vertical line intersecting indentations 36 and 44. Striking bolt marker 48 with a hammer results in the provision of indentations 50, 52 in the end 20 of bolt 12 so that all indentations 36, 44, 50, and 52 in the embodiment shown now lie in a straight line. This is the reference point from which additional measurable tensioning commences and represents the system assembled and ready for operation. To facilitate the provision of indentations 50 and 52, a directional arrow 56 is provided on the top of bolt marker 48. Obviously other alignments for the essential indentations may be designed and used.

To insure consistency of operation and readings, it is important that bolt head 22 be marked so that it can be maintained in the same location once installed. Another indentation 60 can be provided on the surface of component 16 to insure that the bolt head does not move or rotate once it has been installed.

Verification that the nut has been rotated through the prescribed angle for the application can be accomplished by utilizing a quality control device which measures the angle of rotation of nut 24 with respect to bolt shank 22 by observing indentations 50, 52 on bolt end 20 and 36 on nut 24.

In operation, the system is properly lubricated and installed at several locations by hand. A torque wrench is then used to set the reading to a zero angular deflection position. Additional systems can then be installed and once zero settings have been achieved, the desired torque applied to give the preselected angular location for each system. The scale markings on the systems enable them to be permanent and rechecked at any time in the future to the desired angle. If the tensions vary in any use, the nut angles can be recorded on control charts so that a written record exists of all tension settings throughout the entire application.

While the embodiment discussed herein utilizes two flat washers 26, 28, obviously a greater or fewer number may be used as the particular application requires. Compression spring 30 is a universal spring capable of exerting significant, positive and consistent uniform pressure by the use of a series of tips and recesses more particularly described in U.S. Pat. No. 5,072,917 and U.S. patent application Ser. No. 080,637 filed Jun. 24, 1993.

Any number of measurable torque or tension settings may be used, it having been found quite acceptable in operating this system comprising the present invention from a first tensioned position of at least 4 foot pounds through a range extending at least as high as 100 foot pounds and even higher.

One form of an acceptable tensioning and marking tool is shown in FIG. 2 wherein the socket portion has appropriate markings to coincide with a verification unit shown in FIG. 5 formed from clear material to permit the viewing of marks on the nut surface as well as carrying additional readings for measurement. Other representative tools for holding the bolt head in a stationary position during the operation of the system are shown in FIGS. 8 and 9, one suitable for holding a pair of bolt heads at the same time and the other for holding an unlimited number of equally spaced and aligned heads in a stationary position.

With respect to the present invention, it is to be realized that the techniques involved in forming the novel combination set forth herein and the components associated therewith are unlimited and are deemed readily apparent and obvious to one skilled in the art. All equivalent relationships to those illustrated in the drawings and described in the specification are intended to be encompassed herein.

Consequently, the following is considered as illustrative only of the principles of the invention. Further, since numerous modifications and changes will readily occur to those skilled in the art, it is not desired to limit the invention to the exact instruction and operation shown and described. All suitable modifications and equivalents that fall within the scope of the appended claims are deemed within the present inventive concept.

What is claimed is:

1. A bolt tensioning system utilizing a bolt, having a shank, an end, and a head, a nut threadably receivable on the bolt shank, and at least one compression spring for joining structural components under tension, the system operable from a first tensioned to a second tensioned condition and comprising: indicia means associated with at least one structural component; indicia means associated with the nut; and indicia means carried by the bolt end, the component, nut and bolt end indicia means being in a predetermined configuration in the first tensioned condition and assuming a selectable angular relationship with each other when the nut is tightened on the bolt shank to a second predetermined tensioned condition.

2. The system as claimed in claim 1 further comprising at least one flat washer positioned against a compression spring.

3. The system as claimed in claim 1 further comprising at least one flat washer positioned between the nut and a structural component.

4. The system as claimed in claim 1 wherein the first tensioned condition measures at least 4 foot pounds.

5. The system as claimed in claim 2 further comprising at least one flat washer positioned between the nut and a structural component.

6. The system as claimed in claim 2 wherein the first tensioned condition measures at least 4 foot pounds.

7. A bolt tensioning system utilizing a bolt, having a shank, an end, and a head, a nut threadably receivable on the bolt shank, and at least one compression spring for joining structural components under tension, the system operable from a first tensioned to a second tensioned condition and comprising: indicia means carried by one structural component; indicia means carried by the nut adjacent the structural component indicia means; and indicia means carried by the bolt end adjacent the nut indicia means, the component, bolt end and nut indicia means being in linear alignment and at a zero degree angular position when in a threadably joined and first tensioned condition and positionable at a preselected angular relationship with each other when the nut is tightened on the bolt shank to a second predetermined tensioned condition.

8. The system as claimed in claim 7 wherein the indicia means are indentations in the structural component, the bolt end, and the nut.

9. The system as claimed in claim 7 wherein the linear alignment is vertical.

10. The system as claimed in claim 7 further comprising at least one flat washer positioned against a compression spring.

11. The system as claimed in claim 7 further comprising at least one flat washer positioned between the nut and a structural component.

12. The system as claimed in claim 8 wherein the linear alignment is vertical,

13. The system as claimed in claim 11 further comprising at least one flat washer positioned against a compression spring.

14. The system as claimed in claim 13 further comprising at least one flat washer positioned between the nut and a structural component, the flat washer being formed of hardened steel.

15. The system as claimed in claim 14 wherein the first tensioned condition measures at least 4 foot pounds.

* * * * *